United States Patent Office 2,733,227
Patented Jan. 31, 1956

2,733,227

REACTION PRODUCT OF OLEFIN-DIOLEFIN RESIN WITH A COUMARONE-INDENE RESIN

John F. McKay, Jr., Cranford, N. J., assignor to Esso Research and Engineering Company, a corporation of Delaware No Drawing. Application June 26, 1952, Serial No. 295,835

3 Claims. (Cl. 260—45.5)

This invention relates to a method for improving the properties of hydrocarbon resins and more particularly relates to a method of improving the softening properties of olefin-diolefin resins without degrading the color.

It is known that hydrocarbon resins can be produced from certain refinery streams containing olefins and diolefins by a variety of methods such as polymerization using Friedel-Crafts catalysts. The resins produced, however, have softening points that are generally too low for certain applications. For use as the binding ingredient in floor tile, for example, it is desirable that hydrocarbon resins have softening points of about 102° C. or greater so that the floor tiles made therefrom have good hardness-indentation properties. Most of the resins that are produced from such hydrocarbon streams by Friedel-Crafts polymerization have softening points lower than 100° C. Heretofore all attempts to raise the softening points of these resins have seriously degraded the color of the resins. This is undesirable since light colored resins are premium materials. It has now been discovered that 5–50%, preferably 10–25%, of coumarone-indene resins have a surprisingly beneficial effect on the softening point of hydrocarbon resins without seriously causing loss of color. By the process of this invention, the usually low softening hydrocarbon resins have their softening points raised so that they become suitable for use in floor tile and other places where high softening point is required.

Hydrocarbon resins to which the present invention is applicable are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like or solutions, slurries or complexes thereof. The reactions are conducted at temperatures in the range of −100 to +100° C. (preferably −35 to +65° C.). Residual catalyst is quenched by suitable methods, such as addition of methyl alcohol and subsequent filtration, water and/or caustic washing and the final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils. These streams have boiling ranges between 20° and 280° C., or may be composed of any intermediate fraction. A typical stream shows 20% diolefins, 51% olefins, 27% aromatics, and 2% paraffins and naphthenes.

The coumarone-indene resins useful for improving the softening point of the above resins in accordance with the present invention are produced from a fraction of coal-tar solvent naphtha boiling between 150 to 200° C. Such a naphtha contains large proportions of coumarone and indene bodies. The naphtha is refined by alkali washing to remove phenols, tar acids, etc. Pyridine bases are removed by treatment with dilute acid, which also removes certain readily polymerizable hydrocarbons that yield dark tars. The naphtha may then be redistilled.

The polymerization reaction is carried out by the addition of concentrated sulfuric acid catalyst with thorough agitation and temperature control. At the end of the reaction, the sulfuric acid is allowed to settle and drained off with some tar. The oil is then neutralized with alkali and washed with water. The naphtha is distilled over. The resin remaining behind is run into containers where it solidifies.

According to the preferred method of carrying out the present invention, the hydrocarbon resin, prepared as described above, is placed in an agitated reactor together with 5–50%, preferably 10–25%, of the coumarone-indene resin. Oxygen is excluded by passing a slow stream of nitrogen through the vented reactor. Although nitrogen has been cited as a blanketing agent, other gases such as carbon dioxide or hydrocarbons may be used. Air itself may be used, although its use results in some increase in resin color. The temperature is maintained at about 240–280° C. until the desired increase in softening point is attained.

It is important that the temperature be maintained above about 240°, since at lower temperatures no copolymerization takes place. However, care should be taken that the temperature does not exceed the decomposition temperature of the resin. It is also important to maintain the amount of coumarone-indene resin not below 5%, preferably not below 10%, since reaction times are excessively long when a less amount of coumarone-indene resin is used. Coumarone-indene resins are usually more expensive than hydrocarbon resins, so it is desirable from an economic standpoint not to use more than 50%, preferably not more than 25%, coumarone-indene resin. It is essential that oxygen be largely excluded if the color of the product is a factor. The presence of oxygen or air will not affect the ultimate softening point.

The following examples will serve to illustrate the mode of operation as well as the advantages of the present invention, though it will be understood that various other embodiments or modifications not specifically illustrated herein are possible without departing from the spirit or scope of the invention.

EXAMPLE 1

Various hydrocarbon streams containing olefins, diolefins, aromatics, and saturated hydrocarbons obtained by steam cracking of gas oils were polymerized in the presence of a Friedel-Crafts type catalyst at various temperatures. The resins were recovered by stripping off the unreacted hydrocarbons by vacuum distillation. Analysis in each case indicated that the resin was of a non-aromatic structure, since little or none of the aromatic constituents of the feed entered the composition. The data are summarized in the following table:

Table I

| Run No. | 1 | 2 | 3 | 4 | 5 | 6 | 7 | 8 | 9 |
|---|---|---|---|---|---|---|---|---|---|
| Approx. Boiling Pt. (° C.) | 20-48 | 20-125 | 20-125 | 38-130 | 48-130 | 48-130 | 30-280 | 85-260 | 85-260 |
| Composition, Wt. Percent (Approx.): | | | | | | | | | |
| Diolefins | 30 | 20 | 20 | 19.4 | 12 | 12 | 15 | 15 | 15 |
| Olefins | 60 | 48 | 48 | 50.6 | 50.9 | 50.9 | 62 | 45 | 45 |
| Aromatics: | | | | | | | | | |
| Benzene | | 25 | 25 | 22 | 28.5 | 28.5 | 4.5 | | |
| Toluene | | 6 | 6 | 7 | 7.6 | 7.6 | 10.1 | 10 | 10 |
| Higher | | | | | | | 7.2 | 15 | 15 |
| Paraffins, Naphthenes | 10 | 1 | 1 | 1 | 1 | 1 | 1.2 | 15 | 15 |
| Polymerization: | | | | | | | | | |
| Catalyst | AlCl$_3$ | AlCl$_3$ | AlCl$_3$ | AlCl$_3$ | AlCl$_3$ | BF$_3$ | AlCl$_3$ | AlCl$_3$ | BF$_3$ |
| Temperature (° C.) | 15 | 25 | 100 | 45 | 45 | 25 | 25 | 20 | 50 |
| Resin, Wt. Percent [1] | 65-85 | 25-35 | 19 | 30-36 | 18-23 | 15 | 20-30 | 16 | 11 |
| S. Pt.[1] (° C.) | 70-85 | 70-90 | 66 | 85-95 | 80-95 | 74 | 85-100 | 96 | 76 |

[1] The exact softening point and yield depend upon the degree of work-up of the resin, such as stripping conditions, etc.

EXAMPLE 2

A hydrocarbon stream which, according to analysis, consisted approximately of 14% dienes, 42% olefins, and 42% aromatics and saturated hydrocarbons and boiled between 30 and 130° C., prepared by steam cracking of a gas oil, was polymerized in the presence of aluminum chloride at a temperature of 20° C. A hydrocarbon resin was obtained in 25% yield having a softening point of 85° C. and a color of 9. The resin was recovered by stripping off the unreacted hydrocarbons by vacuum distillation. Analysis indicated that this resin was substantially of a non-aromatic unsaturated structure, little or none of the aromatic constituents of the feed having entered the composition.

EXAMPLE 3

225 g. of a hydrocarbon resin (softening point 85° C.) made by the process of Example 2 and 75 g. of a coumarone-indene resin obtained commercially were placed in a stirred reactor blanketed with nitrogen and heated to 280° C. After 3 hours on temperature, the resin product was cooled. The modified resin had a softening point of 105° C. and a color of 9.

This co-bodied resin was used to make a floor tile with the following formulation:

| Parts | Material |
|---|---|
| 38 | Asbestos (Johns-Manville 7r). |
| 38 | Calcium Carbonate. |
| 3 | Titanium Dioxide. |
| 15 | Modified Resin. |
| 6 | Plasticizer (Zeco 3270, a pitch type plasticizer mfd. by G. S. Ziegler Co.). |
| 100 | |

For comparison purposes, a blend was made of 75% of the hydrocarbon resin and 25% of a coumarone-indene resin and the blend was not subjected to the polymerization reaction. The following evaluations show that the experimental floor tile made according to this invention passes Federal specifications. The tile made from the simple blend does not pass Federal specifications.

| | McBurney Identation, Mils | | | Flexure, inches deflection at break | Impact |
|---|---|---|---|---|---|
| | 77° F. | | 115° F., 30 secs. | | |
| | 1 min. | 10 mins. | | | |
| Floor Tile of Invention | 8 | 12 | 37 | 0.6 | Pass. |
| Blend | 13 | 22 (failure) | 56 (failure) | 1.8 | Fail. |

EXAMPLE 4

The following data in Table I show the effect of varying the conditions of copolymerizing the resin of Example 1 with the synthetic copolymer of this invention. Runs 3 and 4 are included in the table to show the effect of simple heat treatment of the hydrocarbon resin. It will be noted that excessively long times are required to give increases in softening points equivalent to those obtained by the cobodying reaction of the present invention. Furthermore, simple heat treatment of hydrocarbon resins always darkens the color of the resins, which is undesirable, whereas no color degradation is obtained when the present invention is employed. Run 5 shows that it is necessary to exclude oxygen if color is a factor since the presence of oxygen badly degrades the color.

Table II

| Run No. | Cobodying Agent | Soft. Pt., ° C., Blend Before Heating | Time, Hrs. | Temp., ° C. | Soft. Pt., ° C.[1] | | Color [2] | |
|---|---|---|---|---|---|---|---|---|
| | | | | | Orig. Resin | Mod. Resin | Orig. Resin | Mod. Resin |
| 1 | 25% Coumarone-indene Resin [3] | 88 | 3 | 280 | 85 | 105 | 9 | 9 |
| 2 | 10% Coumarone-indene Resin [4] | 90 | 24 | 245 | 84 | 106 | 5 | 5 |
| 3 | None—control | | 23 | 245 | 81 | 98 | 3 | 4 |
| 4 | do | | 47 | 245 | 81 | 109 | 3 | 8 |
| | | | 6 | 280 | 75 | 96 | 3 | 5 |
| 5 | 25% Coumarone-indene Resin [3] in presence of air | 88 | 3 | 280 | 85 | 107 | 2 | 12 |
| 6 | 25% Coumarone-indene Resin [5] | 91 | 3 | 280 | 85 | 106 | 4 | 5 |
| 7 | do [6] | 82 | 3 | 280 | 84 | 98 | 9 | 9 |
| 8 | 5% Coumarone-indene Resin [3] | | 3 | 280 | 99 | 105 | 3 | 5 |
| 9 | None—control | | 3 | 280 | 99 | 103 | 3 | 6 |

[1] Ring and ball method.
[2] Dilution method. 1 g. resin dissolved in 67 ml. xylene and color determined in Gardner colorimeter. Higher numbers mean darker resins.
[3] "Cumar T-3" made by Barrett. Soft. pt. 112° C.
[4] "Cumar MH" made by Barrett. Soft. pt. 102° C.
[5] "Cumar V" made by Barrett. Soft. pt. 130° C.
[6] "Cumar RH" made by Barrett. Soft. pt. 77° C.

The nature of the present invention having been thus fully set forth and specific examples of the same given, what is claimed as new and useful and desired to be secured by Letters Patent is:

1. A process for raising the softening point of a non-aromatic unsaturated hydrocarbon resin prepared by the treatment of a steam cracked hydrocarbon fraction boiling between 20° C. and 280° C. with Friedel-Crafts catalysts at temperatures between −100° C. and +100° C. which comprises mixing 100 parts of the resin with 5 to 50 parts of a coumarone-indene resin and heating the mixture at a temperature above about 240° C.–280° C.

2. A process for raising the softening point of a non-aromatic unsaturated hydrocarbon resin prepared by the treatment of a hydrocarbon fraction containing 10 to 35% diolefins, 30–65% olefins, and 0 to 60% of aromatics, paraffins and naphthenes with Friedel-Crafts catalysts at temperatures between −100° and +100° C. which comprises mixing 100 parts of the resin with 5 to 50 parts of a coumarone-indene resin and heating the mixture to about 240° C.–280° C.

3. Product prepared by process of claim 1.

References Cited in the file of this patent
UNITED STATES PATENTS

| | | |
|---|---|---|
| 2,468,482 | Campbell | Apr. 26, 1949 |
| 2,625,523 | Garber et al. | Jan. 13, 1953 |